(12) United States Patent
Khairallah

(10) Patent No.: US 6,323,615 B1
(45) Date of Patent: Nov. 27, 2001

(54) MODULAR ARTICULATED ROBOT STRUCTURE

(76) Inventor: Charles Khairallah, Apartment 1203, 1650 Lincoln, Montreal, Quebec (CA), H3H 1H1

( * ) Notice: Subject to any disclaimer, the term of this patent is extended or adjusted under 35 U.S.C. 154(b) by 0 days.

(21) Appl. No.: 09/408,939

(22) Filed: Sep. 30, 1999

Related U.S. Application Data

(63) Continuation of application No. PCT/CA98/00293, filed on Apr. 1, 1998.

(30) Foreign Application Priority Data

Apr. 1, 1997 (GB) .................................................. 9706625

(51) Int. Cl.[7] .................................................. B25J 9/18
(52) U.S. Cl. ................................ 318/568.11; 318/568.12; 318/561; 318/587; 901/1; 901/8; 901/11; 901/23; 901/46; 901/28
(58) Field of Search .................................... 318/560, 561, 318/568.1, 568.11, 568.12, 567, 580.507; 901/1, 8, 11, 23, 50, 46, 28

(56) References Cited

U.S. PATENT DOCUMENTS

| | | |
|---|---|---|
| 3,712,481 | 1/1973 | Harwood . |
| 4,310,958 * | 1/1982 | Balaud et al. . |
| 4,561,816 * | 12/1985 | Dingess .................................. 901/22 |
| 4,685,349 | 8/1987 | Wada et al. . |
| 4,724,716 | 2/1988 | Kawai . |
| 4,766,775 | 8/1988 | Hodge . |
| 4,828,453 * | 5/1989 | Martin et al. .......................... 901/28 |
| 4,914,975 | 4/1990 | Bailey et al. . |
| 4,949,586 | 8/1990 | Akagawa . |
| 5,130,632 | 7/1992 | Ezawa et al. . |
| 5,142,932 * | 9/1992 | Moya et al. ........................... 901/23 |
| 5,515,934 * | 5/1996 | Davis ..................................... 180/8.2 |
| 5,523,662 | 6/1996 | Goldenberg et al. . |
| 5,540,541 * | 7/1996 | Gosdowski et al. ................... 901/15 |
| 5,672,924 * | 9/1997 | Wallace et al. ....................... 310/152 |

FOREIGN PATENT DOCUMENTS

| | | |
|---|---|---|
| 637 870 | 8/1983 | (CH) . |
| 2 754 609 | 4/1979 | (DE) . |
| 195 17 852 | 12/1995 | (DE) . |
| 0 108 657 | 5/1984 | (EP) . |
| 0 658 402 | 6/1995 | (EP) . |
| 2 593 426 | 7/1987 | (FR) . |
| 62-61485 | 9/1994 | (JP) . |

\* cited by examiner

Primary Examiner—David S. Martin
(74) Attorney, Agent, or Firm—Swabey Ogilvy Renault; Michel Sofia

(57) ABSTRACT

A modular articulated robot structure (FIG. 4) composed of a series of independent modules (10,100,300) releasably connected to each other to form various configurations. The modules (10,100,300) may be of the rotary (10), linear (100), or wheeled (300) type. The rotary modules (10) are generally formed of first and second substantially U-shaped structural members (12,14) pivotally attached to one another by means of a pair of axles or pivot pins (26) adapted to support a workload exerted on the module (10). A motor (48) is mounted internally of the module (10) for pivoting the second structural member (14) relative to the first structural member (12). The motor (48) is connected to the second structural member (14) in such a way that it is not submitted to outside loads exerted on the module (10). Typically, the first and second structural members (12,14) are provided with cooperating abutment surfaces (17,19,74,76,78,80) for increasing the overall structural rigidity of the module (10) in certain positions thereof.

25 Claims, 11 Drawing Sheets

MODULAR ARTICULATED ROBOT STRUCTURE

This is a continuation of International PCT Application No. PCT/CA98/00293 filed on Apr. 1, 1998, which claims the benefit of British Application No. GB 9706625.2.

BACKGROUND OF THE INVENTION

1. Field of the Invention

The present invention relates to the field of robotics and, more particularly, to a modular articulated robot structure.

2. Description of the Prior Art

In the prior art it is known to have robot systems which are modular, reconfigurable and expandable to thus improve the flexibility and versatility thereof. For instance, U.S. Pat. No. 5,523,662 issued to Goldenberg et al. on Jun. 4, 1996, discloses a manipulator arm formed of a number of independent rotary joints releasably connected to each other by means of elongated connector members. The manipulator arm may be disassembled and reassembled in order to obtain different arm configurations. More particularly, each joint generally includes a L-shaped member and an inverted U-shaped member pivotally movable with respect to the L-shaped member. A motor having a drive shaft is mounted to the L-shaped member for pivoting the inverted U-shaped member relative to the L-shaped member. The inverted U-shaped member includes a pair of opposed downwardly extending connecting plates which are pivotally connected respectively to an upwardly extending portion of the L-shaped member and to the drive shaft of the motor. Accordingly, the U-shaped member is supported by both the L-shaped member and the drive shaft of the motor, whereby the drive shaft is submitted to workloads and static loads, and thus the overall structural rigidity of the manipulator arm is compromised.

Therefore, it would be advantageous to provide a rotary joint having a motor which is configured and positioned to transmit a pivotal force without supporting any load other than the rotational load.

Furthermore, the aforementioned L-shaped and inverted U-shaped members do not provide support to each other at certain relative positions thereof which would increase the rigidity of the above described flexible manipulator arm in these positions, as this increased rigidity may be required to accomplish particular tasks.

It would also be very suitable to have a modular robot structure wherein each module is provided with mating electrical connectors, such as pin connectors, to enable quick connection and disconnection of adjacent modules.

SUMMARY OF THE INVENTION

It is therefore an aim of the present invention to provide a compact rotary module forming part of an articulated robot structure and having a motor which is essentially not submitted to loads other than the rotational loads induced by the motor itself.

It is also an aim of the present invention to provide a robot system having a flexible architecture.

It is also an aim of the present invention to provide a displaceable robot system which is adapted to evade obstacles and which offers increase maneuverability.

It is a further aim of the present invention to provide a robot system which is modular, expandable and reconfigurable.

It is a still further aim of the present invention to provide a modular robot structure which is designed to offer ease of assembly and disassembly.

It is a still further aim of the present invention to provide a flexible robot structure which is adapted to be configured to provide sufficient structural rigidity to perform a particular task.

It is a still further aim of the present invention to provide a robot system which provides a relatively lightweight structure.

It is a still further aim of the present invention to provide a robot system which is relatively simple and economical to manufacture.

Therefore, in accordance with the present invention, there is provided a module for forming a segment of an articulated robot structure, comprising first and second structural members, idle axle means for pivotally mounting said second structural member to said first structural member, motor means mounted to said first structural member and adapted for pivoting said second structural member about said axle means and relative to said first structural member.

Also in accordance with the present invention, there is provided a module for forming a segment of an articulated structure, comprising first and second structural members pivotally mounted together, motor means for imparting a rotational movement to said second structural member relative to said first structural member, said first and second structural members having cooperating abutment means for providing substantially uniform support to said second structural member when rotated to a limit position thereof.

Further in accordance with the present invention, there is provided an articulated structure comprising at least two serially connected modules which each comprise first and second structural members pivotally mounted to one another, and motor means for imparting a rotational movement to said second structural member relative to said first structural member, said first structural member of each module defining abutment means against which said first structural member of an adjacent module may be supported when said second structural member connecting said first structural members of two adjacent modules is rotated to a limit position thereof.

Still further in accordance with the present invention, there is provided an extendable and contractible module for forming a segment of an articulated robot structure, comprising first and second structural members linearly moveable with respect to each other, at least one of said structural members being adapted to be physically and electrically coupled to another module, and motor means for imparting relative linear motion to said first and second structural members.

Still further in accordance with the present invention, there is provided a module for forming a segment of a robot structure, comprising a pair of spaced-apart connecting plates joined at opposed end portion thereof by a pair of side plates, at least one of said connecting plates including attachment means for releasably attaching said module to another module and further including electrical connectors for mating engagement with connectors of another module, said connectors being connected to conductor means for enabling control commands to be fed to and through said module, wheel means for supporting and moving said module on a supporting surface, and motor means for driving said wheel means in response to control commands sent to said module.

Still further in accordance with the present invention, there is provided a flexible robot structure comprising a number of serially connected rotary modules which each include first and second end portions adapted to mate with end portions of adjacent rotary modules, connecting means for pivotally connecting said first and second end portions together, motor means for driving said rotary modules, and control means for controlling movement of said rotary modules, whereby said motor means may be operated to bring said first end portion of a module disposed at a first end of said flexible robot structure in mating engagement with a second end portion of another module disposed at a second end portion so as to for a loop configuration.

Still further in accordance with the present invention, there is provided a mobile modular robot comprising at least one wheeled or tracked module adapted to support and displace said mobile modular robot on a supporting surface, attachment means for pivotally connecting support modules at opposed front and rear ends of said wheeled or tracked module, motor means for driving said wheeled or tracked module and pivoting said support modules relative to said wheeled or tracked module, control means for controlling movements of said wheeled or tracked module and of said support modules, whereby said mobile modular robot may run on said wheeled or tracked module or, alternatively, said support module may be pivoted so as to support said wheeled or tracked module in a raised position over the supporting surface and subsequently actuated to provide legged locomotion.

BRIEF DESCRIPTION OF THE DRAWINGS

Having thus generally described the nature of the present invention, reference will now be made to the accompanying drawings, showing by way of illustration a preferred embodiment thereof, and in which.

DESCRIPTION OF THE PREFERRED EMBODIMENTS

Figure 1:
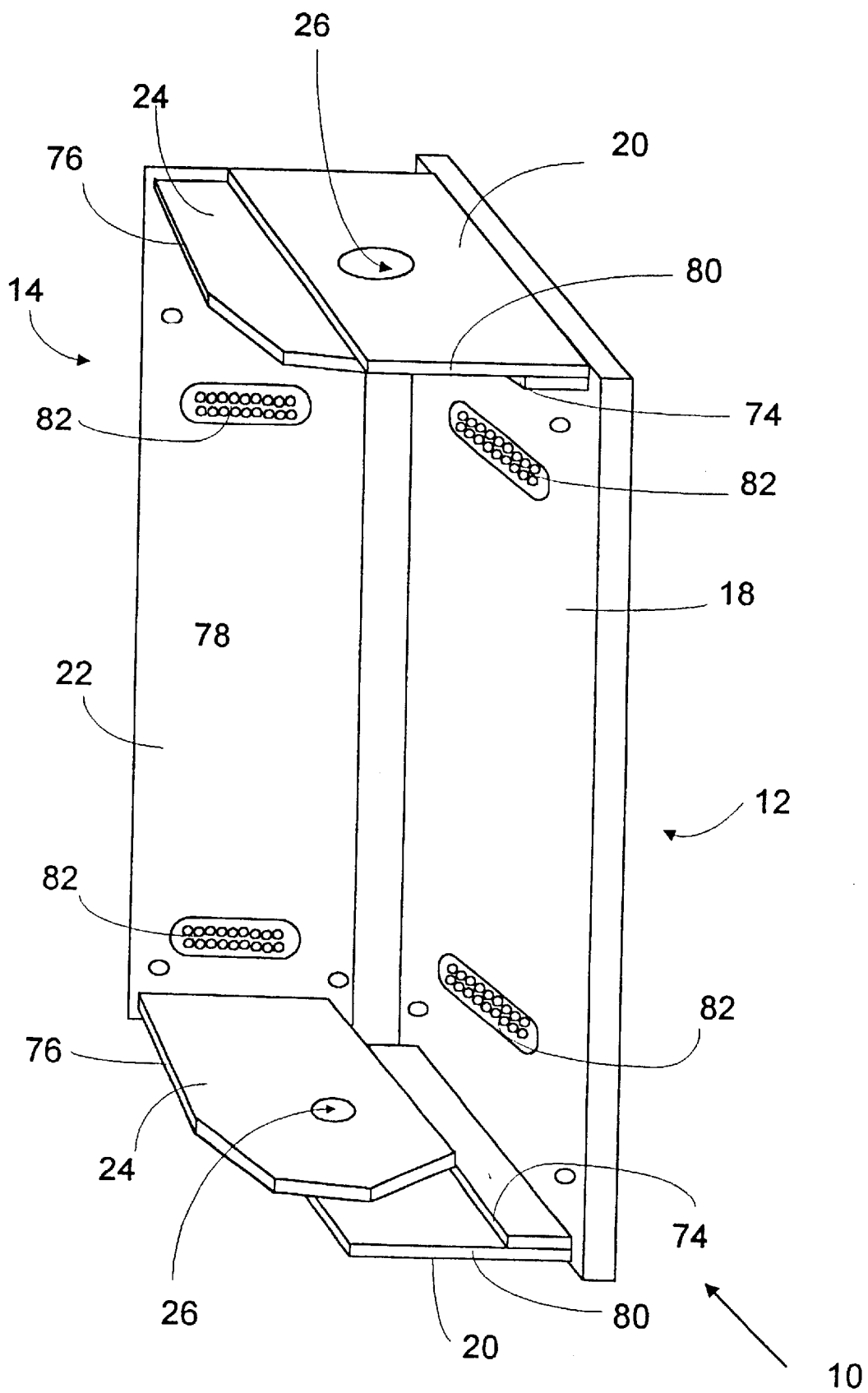
FIG. 1 is a simplified perspective view of a pair of structural members of a rotary module of an articulated robot structure according to the present invention.

Now referring to the drawings, a modular, expandable and reconfigurable articulated robot system in accordance with the present invention will be described.

As will be explained in more details hereinafter, the modular articulated robot system is formed of a series of similar or different independent modules which may be configured so as to perform a particular task.

Figure 2:
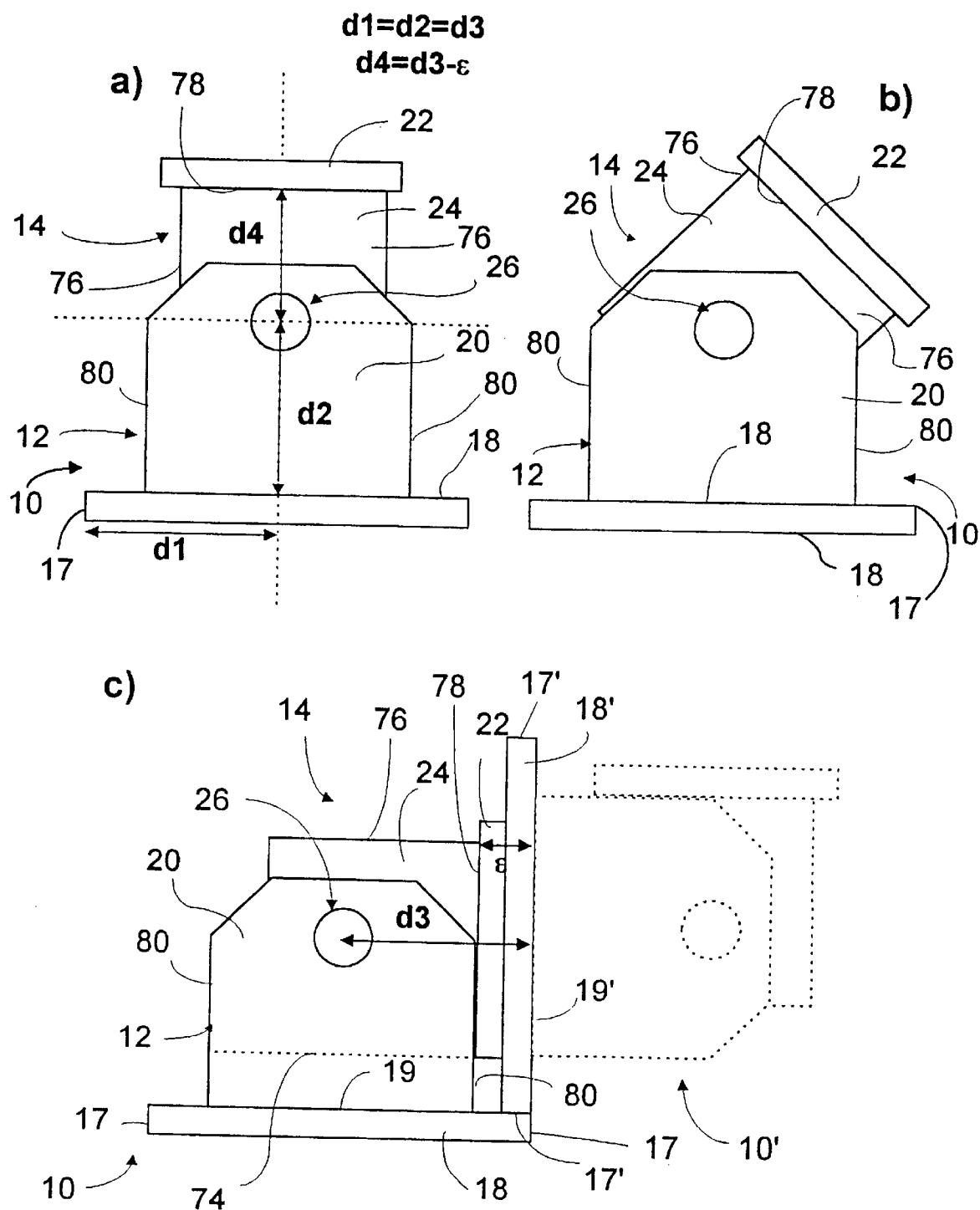
FIGS. 2a to 2c are simplified side elevational views of the rotary module of FIG. 1 shown in different positions, with FIG. 2c illustrating in phantom lines an additional rotary module mounted to the rotary module of FIGS. 2a and 2c.
Figure 3:
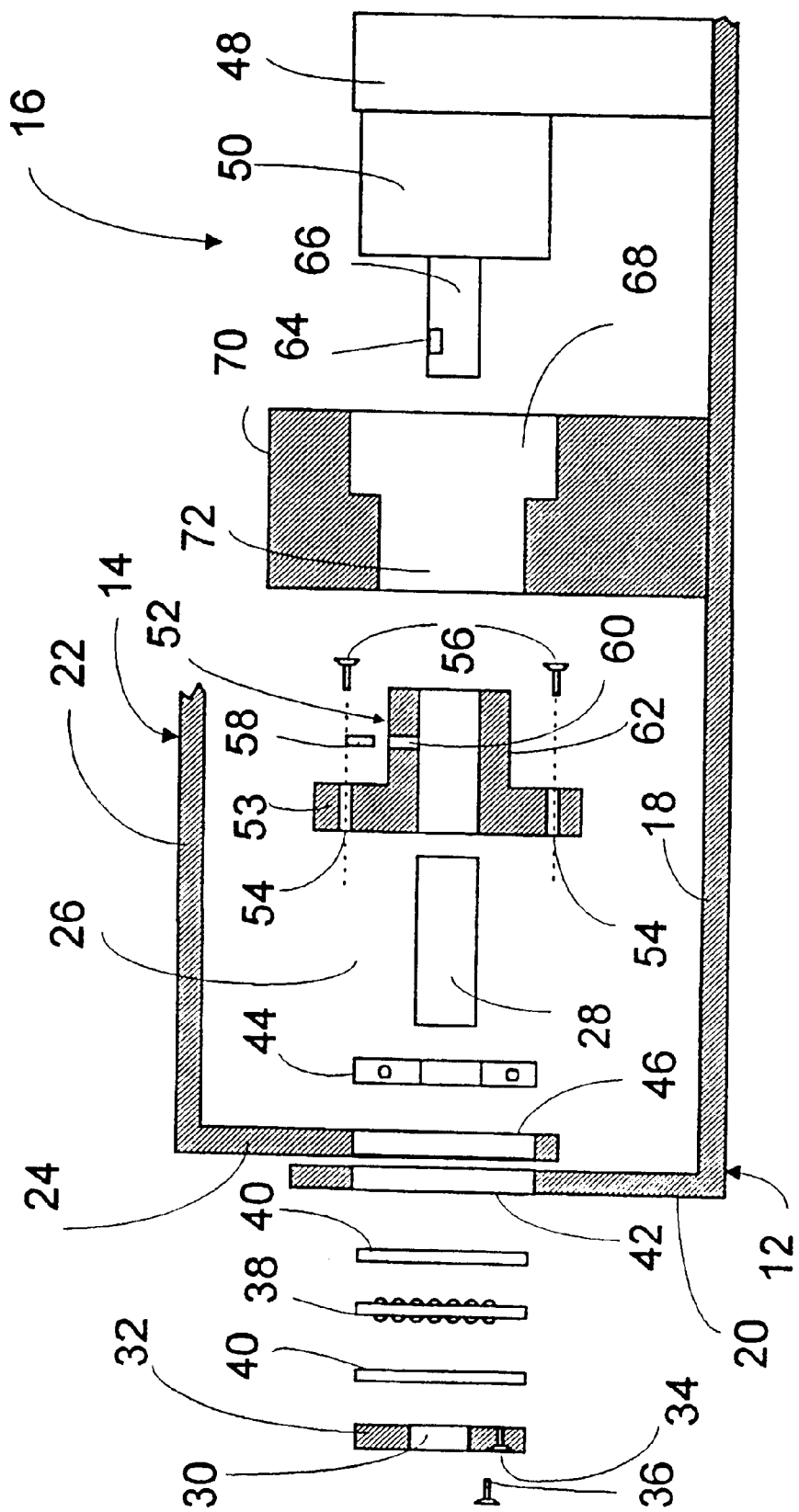
FIG. 3 is an exploded view of a left portion of the rotary module of FIG. 1 showing how the structural members of the module are pivotally attached to each other.

In accordance with the present invention, FIGS. 1 to 3 illustrate a rotary module 10 of an articulated robot structure. Basically, the rotary module 10 comprises a pair of pivotally connected structural members 12 and 14, and a motor and transmission assembly 16 positioned and configured to impart a rotational movement to the structural member 14 with respect to the structural member 12.

More specifically, the structural member 12 has a substantially U-shaped or C-shaped configuration and includes a base plate 18 and a pair of parallel side plates 20 extending at right angles from opposed ends of the base plate 18. According to a preferred embodiment of the present invention, the base plate 18 and the side plates 20 are integral and made of steel.

Similarly, the structural member 14 has a substantially U-shaped or C-shaped configuration and includes a base plate 22 and a pair of parallel side plates 24 extending at right angles from opposed ends of the base plate 22. The base plate 22 and the side plates 24 are also preferably integral and made of steel.

As seen in FIG. 1, the parallel side plates 24 of the structural member 14 are dimensioned and configured to fit within the space defined between the parallel side plates 20 of the structural member 12. The adjacent side plates 20 and 24 of the structural members 12 and 14 are pivotally attached to one another by means of connecting pivot assemblies 26 disposed on a common axis.

More specifically, as seen in FIG. 3, each connecting pivot assembly 26 essentially comprises a pivot pin 28 pressure fitted in a central bore 30 defined in a disc 32 secured to an outer surface of a side plate 20 of the structural member 12. The disc 32 defines a number of circumferentially spaced-apart holes 34 through which fasteners 36 are inserted for securing the disc 32 to the side plate 20. The pivot pin 28 extends through a lateral bearing 38 disposed between a pair of washers 40 mounted in a hole 42 defined in the side plate 20 of the structural member 12 and through a bearing 44 pressure fitted in a hole 46 defined in the side plate 24 of the structural member 14.

As seen in FIG. 3, the motor and transmission assembly 16 includes a motor 48 rigidly secured to the base plate 18 of the structural member 12. The motor 48 may be of any suitable type such as a conventional DC electric servo motor. The motor 48 has a drive shaft coupled to a conventional gear box 50 which is adapted to transfer the rotational force developed by the motor 48 to a coupling 52 secured to an inner surface of one of the side plates 24 of the structural member 14 to thus cause a pivot of the latter with respect to the structural member 12.

The coupling 52 includes a circular flange portion 53 which defines a plurality of circumferentially spaced-apart apertures 54 through which fasteners 56 are inserted to secure the adaptor 52 to the side plate 24. A locking pin 58 or the like is inserted through a radial hole 60 defined in a hollow elongated cylindrical portion 62 of the adaptor 52 and in a hole 64 defined in an output shaft 66 coupled to the gear box 50 to lock the adaptor 52 to the output shaft 66.

The gear box 50 is disposed in a recess 68 defined in a support member 70 fixedly secured to the base plate 18 of the structural member 12. The support member 70 further defines a cylindrical bore 72 which communicates with the recess 68 and which is adapted to freely accommodate the cylindrical portion 62 of the adaptor 52 for rotational movement therein.

According to the above described construction, it is the connecting pivot assemblies 26 which support the outside loads exerted on the rotary module 10 and thus the drive shaft of the motor 48 may be used substantially solely to impart a relative rotational movement between the structural members 12 and 14. With respect to structural member 12, the structural member 14 and any other load supported thereby are supported by structural member 12 by the pivot assemblies 26 and not by output shaft 66 of the motor 48. Therefore, it can be said that the output shaft 66 is mounted in such a way that it does not support any load other than the effort it must exert to rotate the structural member 14 relative to the structural member 12. This results in an increase of the overall structural rigidity of the rotary module 10.

As shown in FIGS. 1 and 2, the structural member 14 may be pivoted, upon activation of the motor 48, over a range of substantially 180 degrees with respect to the structural member 12. The side plates 20 of the structural member 12 are provided with inner shoulders 74 against which the front or rear edges 76 of the side plates 24 of the structural member 14 will abut when the latter is rotated at 90 degrees relative to the structural member 12. The distance d4, as shown in FIG. 2a, is such that when the base plate 22 of the structural member 14 is perpendicular to the base plate 18 of the structural member 12 (see FIG. 2c), the underside 78 of the base plate 22 abuts against the front or rear side edges 80 of the side plates 20 depending whether the structural member 14 has been rotated clockwise or counterclockwise. The above described abutment surfaces further contributes to increasing the overall rigidity of the rotary module 10 in certain relative positions of the structural members 12 and 14 thereof.

As illustrated in FIG. 2c, a second identical rotary module 10', shown in dotted lines, can be physically attached to the first rotary module 10 by inserting conventional fasteners (not shown), such as bolts, through corresponding apertures defined in the base plate 18' of the second rotary module 10' and in the base plate 22 of the first rotary module 10. By centering the base plate 18' relative to the base plate 22 and by equaling the distances d1 and d2, shown in FIG. 2a, the front edges 171 of the base plate 18' will abut the upper surface 19 of the base plate 18 and will extend in a plane perpendicular with respect thereto when the structural members 12 and 14 of the first rotary module 10 are at right angles with respect to each other as in FIG. 2c. This thus provides additional structural rigidity to the assembly.

Figure 4:
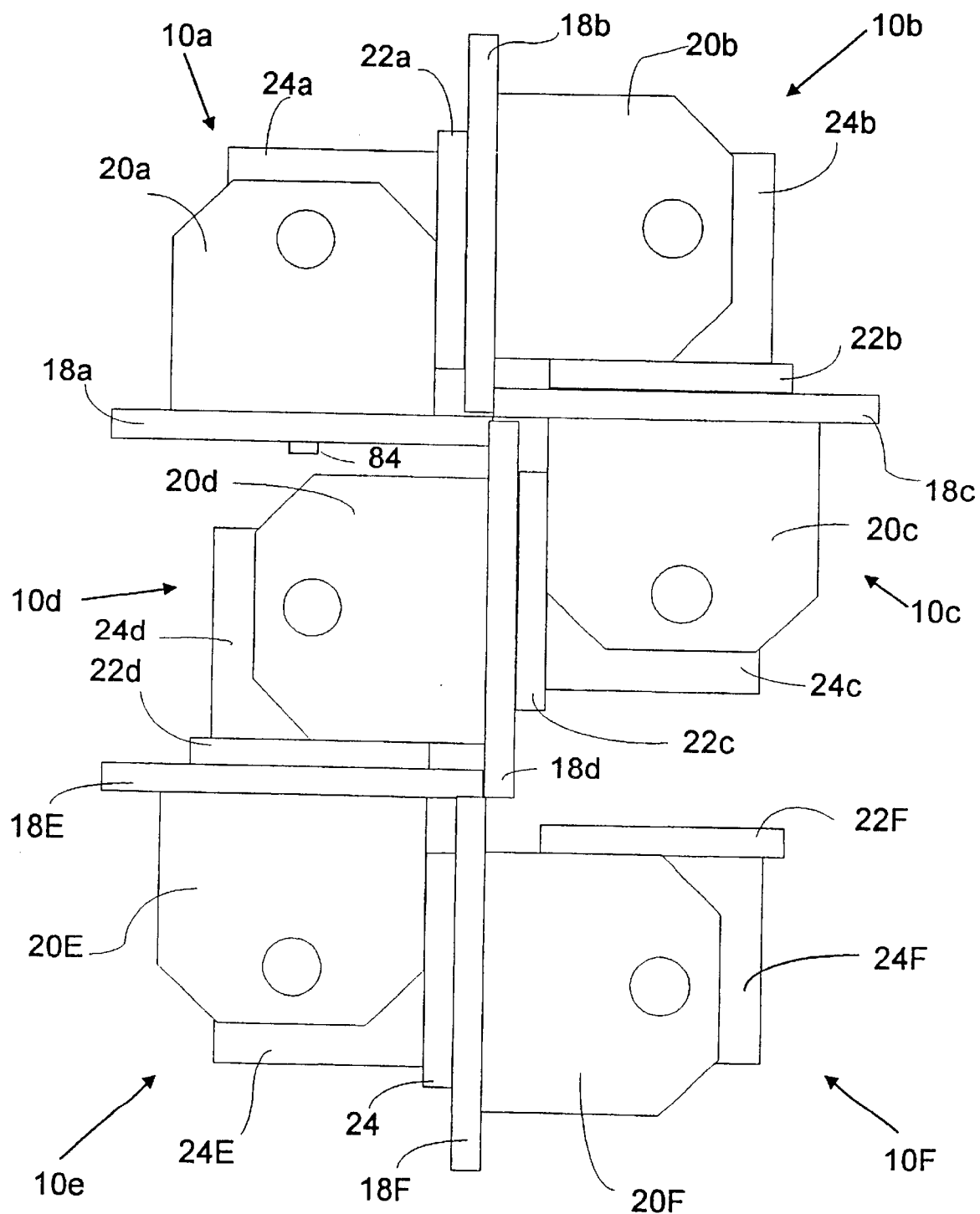
FIG. 4 is a plan view of a number of similar rotary modules assembled together in succession and showing the abutment interaction existing therebetween.

FIG. 4 shows an articulated robot structure which is formed of a series of six identical rotary modules 10a to 10f attached to one another in the manner described hereinbefore. It can be seen that when the structural members 24a to 24d of the first four rotary modules 10a to 10d are rotated in the same direction to their respective limit positions, the base plates 18a to 18d thereof are all in abutting relation, whereby these four rotary modules 10a to 10d may serve as a rigid structural base for supporting the remaining rotary modules 10e and 10f which could be used to perform a particular task. It is noted that by having the distance d1=d2=d3 and d4=d3−$\epsilon$, as shown in FIG. 2, it is possible to minimize the volume required to form a loop with four consecutive rotary modules 10a to 10d as described above.

Although FIG. 4 illustrates a series of six rotary modules 10a to 10f, it is understood that the number of assembled modules 10 can be varied depending on the intended application.

Each rotary module 10 further includes a position sensor for sensing the position of the motor shaft of the module 10 and a second sensor (not shown) for detecting obstacles. According to a preferred embodiment of the present invention, the position sensor is an incremental optical encoder. Two limit switches (not shown) are mounted on opposed sides of the support member 70 on each side of the gear box 50 so as to be engaged by the undersurface of the base plate 22 when the same is rotated clockwise or counterclockwise to a limit position thereof for initialization purposes. A conventional power source (not shown), such as a battery, which may be rechargeable, may be mounted to each module 10 for supplying power to the motor 48 thereof.

According to a preferred embodiment of the present invention, each module 10 further includes an electronic controller, such as a DSP (Digital Signal Processor), which is mounted, for instance, to structural member 12 and which is connected to the limit switches and the sensors of the module 10 to process their respective output information. Accordingly, velocity feedback may be obtained by differentiating the output of the position sensor in filtering the resulting signal.

As seen in FIG. 1, the base plates 18 and 22 of each module 10 are provided with a pair of connectors 82 which are connected to the electronic controller of the module by electrical conductors. The connectors 82 are such that base plate 18 of one module 10 is connected to the base plate 22 of an adjacent module 10 by mating their connectors 82 thereby enabling control commands to be fed through the various modules 10 of a modular robot structure. Accordingly, the electronic controllers of a number of serially connected modules 10 can communicate between each other via, for instance, a RS-232 communication protocol to properly control the overall motion of the assembled modules. The connectors 82 may consist of pin connectors to enable quick connection and disconnection of the modules 10. This configuration eliminates electrical conductors running between the modules 10; indeed, the electrical conductors are used only within each module 10 to connect the connectors 82 to the electric controller of a given module 10. The electrical connection of the module to one another is ensured by the cable-less connectors 82.

The above described control system (not shown) is adapted to automatically detect the number of assembled modules and to generate an appropriate control algorithm in function of the number of degrees of freedom of the articulated modular robot structure. The control system is also adapted to compute the relative position of the motor shaft with respect to its module 10 and the relative positions of the assembled modules 10, and thus the absolute position of each module 10. The control system can also calculate to what position each motor shaft should be rotated to generate a desired motion of the modular robot structure. The control system is further adapted to establish a desired trajectory so as to evade an obstacle detected by the sensors of the modules 10.

A further advantage of the present invention resides in the fact that, in operation, the modular robot structure may be reconfigured by the control system. For instance, the modular robot structure of FIG. 4 which has two opposed ends, namely base plates 18a and 22f, may be reconfigured to form a closed loop. To do so, the control system commands appropriate movements of each rotary module 10a to 10f to enable the mating engagement of the connectors 82 of the base plates 18a with the connectors 82 of the base plate 22f. Once this connection is accomplished, the control system will automatically recognize the novel loop configuration of the modular robot structure and will then generate an appropriate control algorithm. As seen in FIG. 4, the underside surface of the base plate 18a is provided with pegs 84 which are adapted to be inserted in corresponding holes (not shown) defined in the top surface of the base plate 22f in order to physically solidify the connection between the base plates 18a and 22f.

Figure 5:
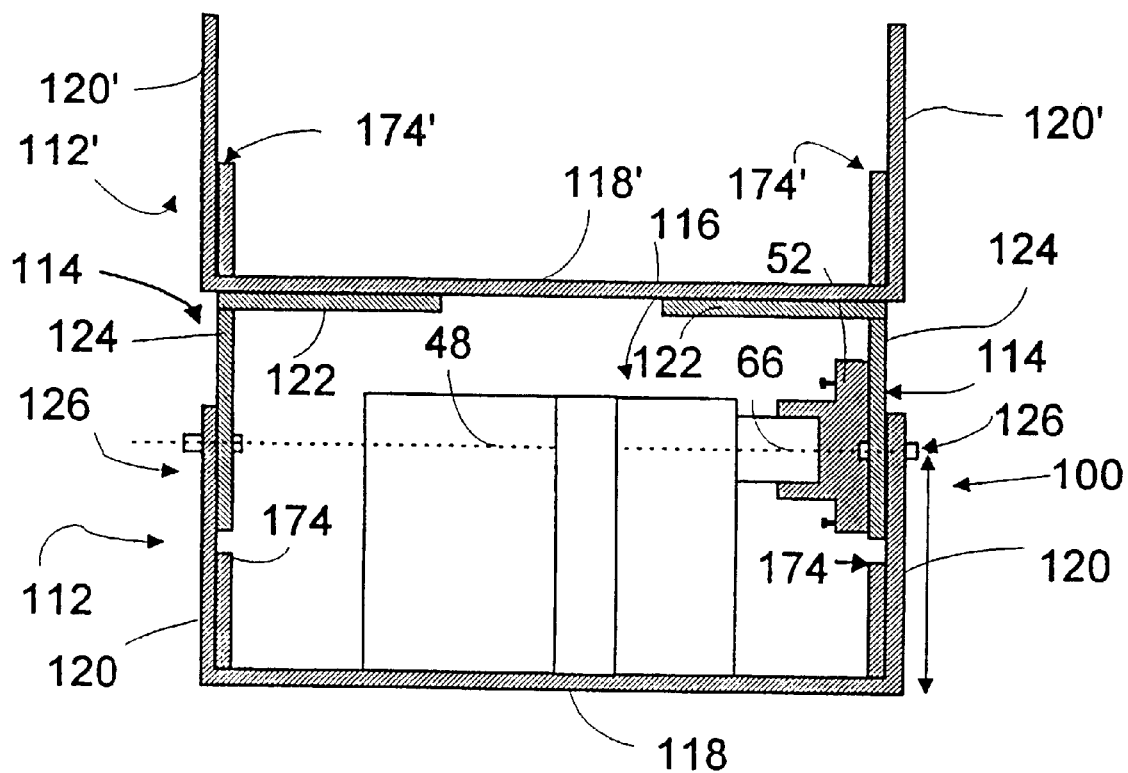
FIG. 5 is a simplified elevational view of a rotary module connected to a second similar rotary module (only part of which is shown) according to a second embodiment of the present invention.

Referring now more specifically to FIG. 5, there is shown a second type of rotary module 100 which differs from the first type of rotary module 10 in that the structural member 14 has been replaced by two substantially L-shaped members 114 which are pivotally connected to respective opposed side plates 120 of a structural member 112 for rotation about a common axis. As seen in FIG. 5, each L-shaped member 114 includes a side plate 124 which defines an aperture configured to receive a connecting pivot assembly 126 for pivotally supporting the side plate 124 adjacent an inner surface of a side plate 120 of the structural member 112. Each L-shaped member 114 further comprises a base plate 122 which extends inwardly and parallel to the base plate 118 once the L-shaped member 114 has been properly pivotally attached to a side wall 120 of the structural member 112. The base plates 122 provide a support surface on which a base plate 118' of a structural member 112' of a second rotary module 100' may be fixedly secured. The remaining structural and control features of the rotary module 100 are similar to those of the rotary module 10 described in detail hereinbefore.

Figure 6:
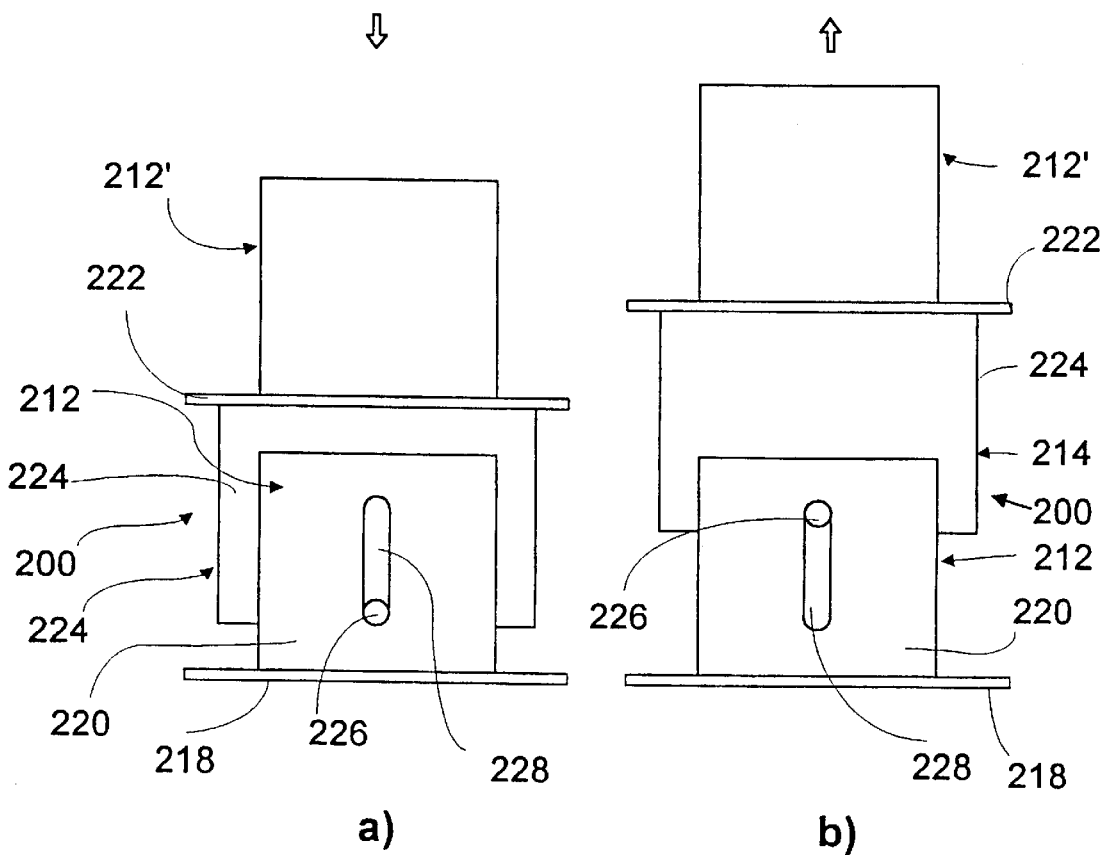
FIGS. 6a and 6b are side elevational views showing indifferent positions of a linearly displaceable module connected to an adjacent similar linearly displaceable module (only part of which is shown) according to a third embodiment of the present invention.

Referring now to FIGS. 6a and 6b, there is shown a linearly displaceable module 200 according to the present invention. The linearly displaceable module 200 comprises a pair of structural members 212 and 214, and is provided with a linear motor (not shown) which is adapted to impart a reciprocating motion to the structural member 214 relative to the structural member 212. The side plates 224 of the structural member 214 are provided with outwardly extending pins 226 which are constrained to move in guide slots 228 defined in the side plates 220 of the structural member 212 such that structural member 214 can displace, with respect to structural member 212, between retracted and extended positions, as seen in FIGS. 6a and 6b respectively. This type of modules may be used to form an expandable modular robot structure. The remaining structural and functional features of the linearly displaceable module 200 are similar to those of the rotary module 10 described hereinabove.

Figure 7:
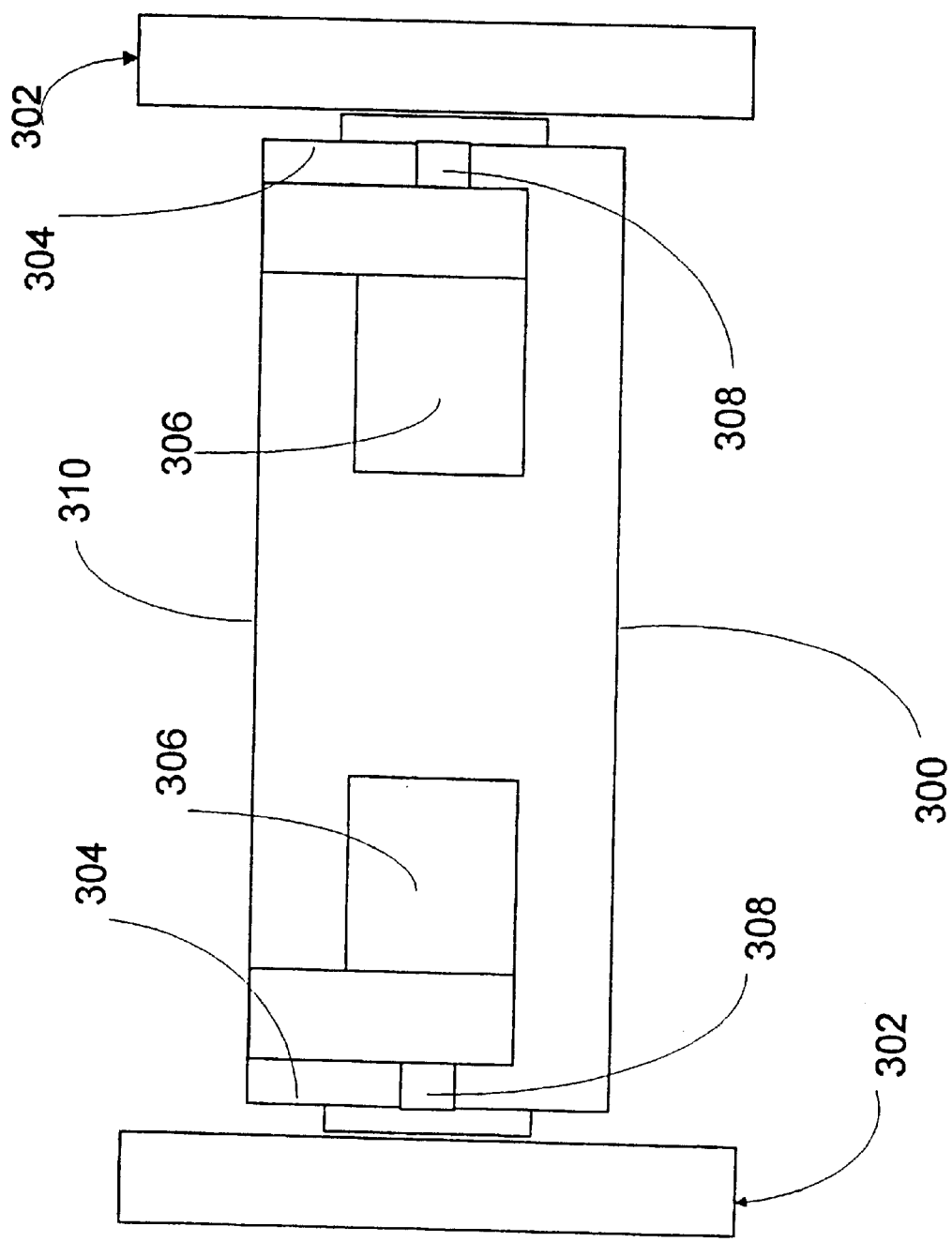
FIG. 7 is a simplified schematic top plan view of a wheeled module of an articulated robot structure according to a fourth embodiment of the present invention.
Figure 8:
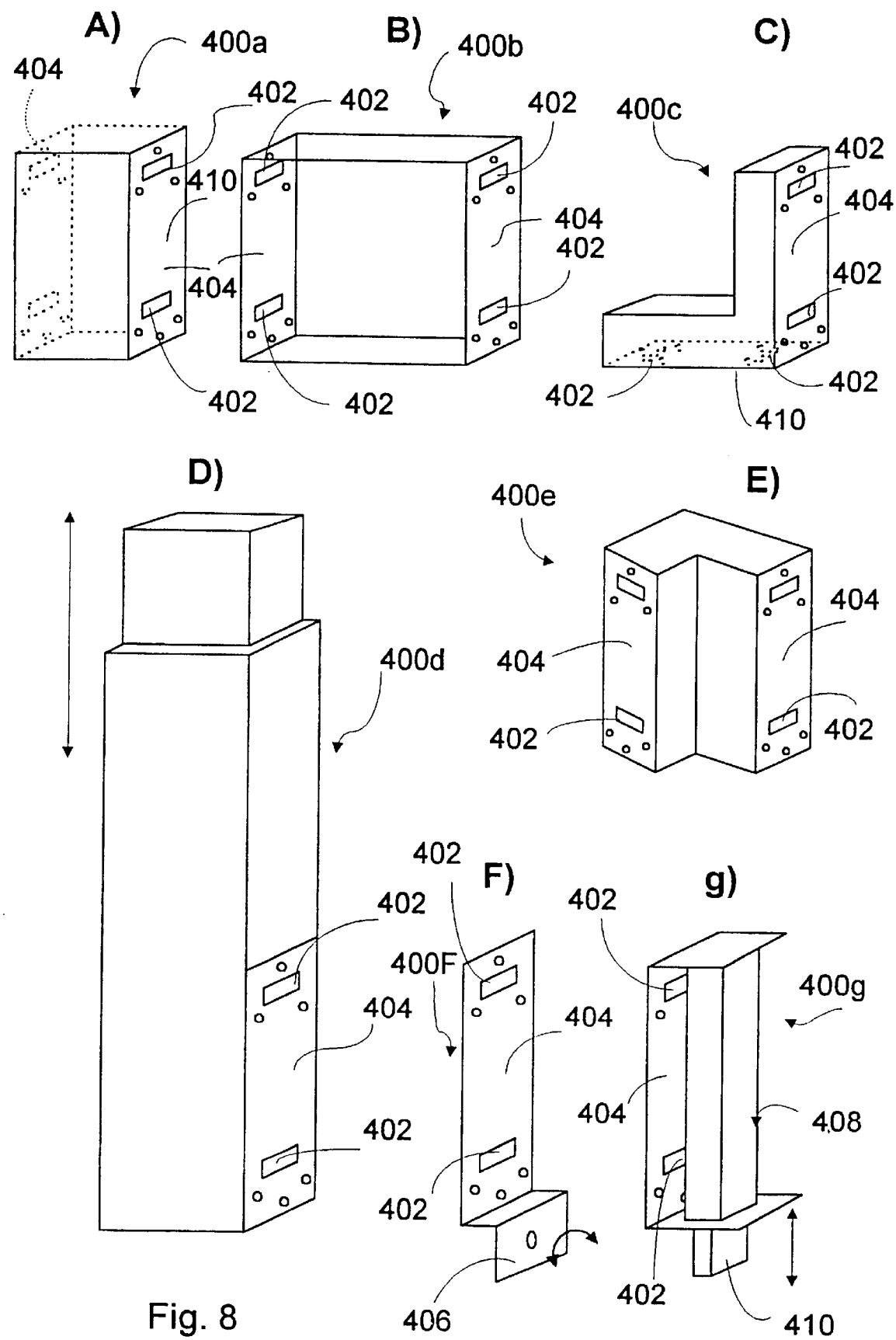
FIGS. 8a to 8g illustrate various adaptors which can be used in combination with the rotary, linearly displaceable and/or wheeled modules.

FIG. 7 illustrates an alternative of the present invention wherein a pair of lateral wheels 302 are mounted outwardly of a pair of side plates 304 of an independent wheeled module 300. A pair of motor and transmission assemblies 306 are mounted inwardly of the module 300 to drive respective lateral wheels 302. A position sensor (not shown) is coupled to each drive shaft 308 of the motor and transmission assemblies 306 and an electronic controller (not shown) is provided to process the information measured by the position sensors. The base plates 310 of the module 300 are provided with electrical connectors (not shown), such as pin connectors, for allowing the module 300 to be connected to other types of modules, such as the rotary module 10 or the linearly displaceable module 200. An example of such an assembly appears in FIGS. 11a and 11b which are described hereinafter. Furthermore, the base plates 310 define a number of apertures (not shown) to receive fasteners for fixedly securing the module 300 to another module.

FIGS. 8a to 8g illustrates different type of adaptors which could be mounted to the base or connecting plate of the above described modules. It can be seen that all of the illustrated adaptors 400a to 400g are provided with connectors 402 for allowing control commands to be fed through the adaptors and through the independent modules connected therewith. The connectors 402 are mounted to connecting plates 404 which defines a number of apertures configured to receive therein fasteners for fixedly attaching the adaptor to a base or connecting plate of a given module.

More specifically, the adaptors 400a and 400b are each provided with a pair of parallel opposed connecting plates 404 and thus they can be connected between two modules of a modular robot structure to increase the length thereof.

The adaptors 400c and 400e, which are provided with a pair of perpendicular connecting plates 404, may be used to avoid obstacles.

The adaptor 400d may be mounted to a ceiling structure or the like to elevate or lower a modular robot structure mounted to the connecting plate 404 thereof.

The adaptor 404f includes a connecting plate 404 adapted to be mounted at a free end of a modular robot structure, and a motor supporting plate 406 extending in a plane parallel to the connecting plate 404 while being offset thereof for supporting a motor having an axis of rotation which is perpendicular with respect thereto.

Finally, the adaptor 400g includes a connecting plate 404 which may be mounted at a free end of a modular robot structure, and a linear motor assembly 408 having a translationally displaceable member 410 positioned so as to provide motion in a plan parallel to the connecting plate 404.

In view of the foregoing it is readily seen that a variety of robot configurations may be obtained by using a combination of different modules 10, 200 and 300 and adaptors 400 in an assembled modular robot structure.

Figure 9:
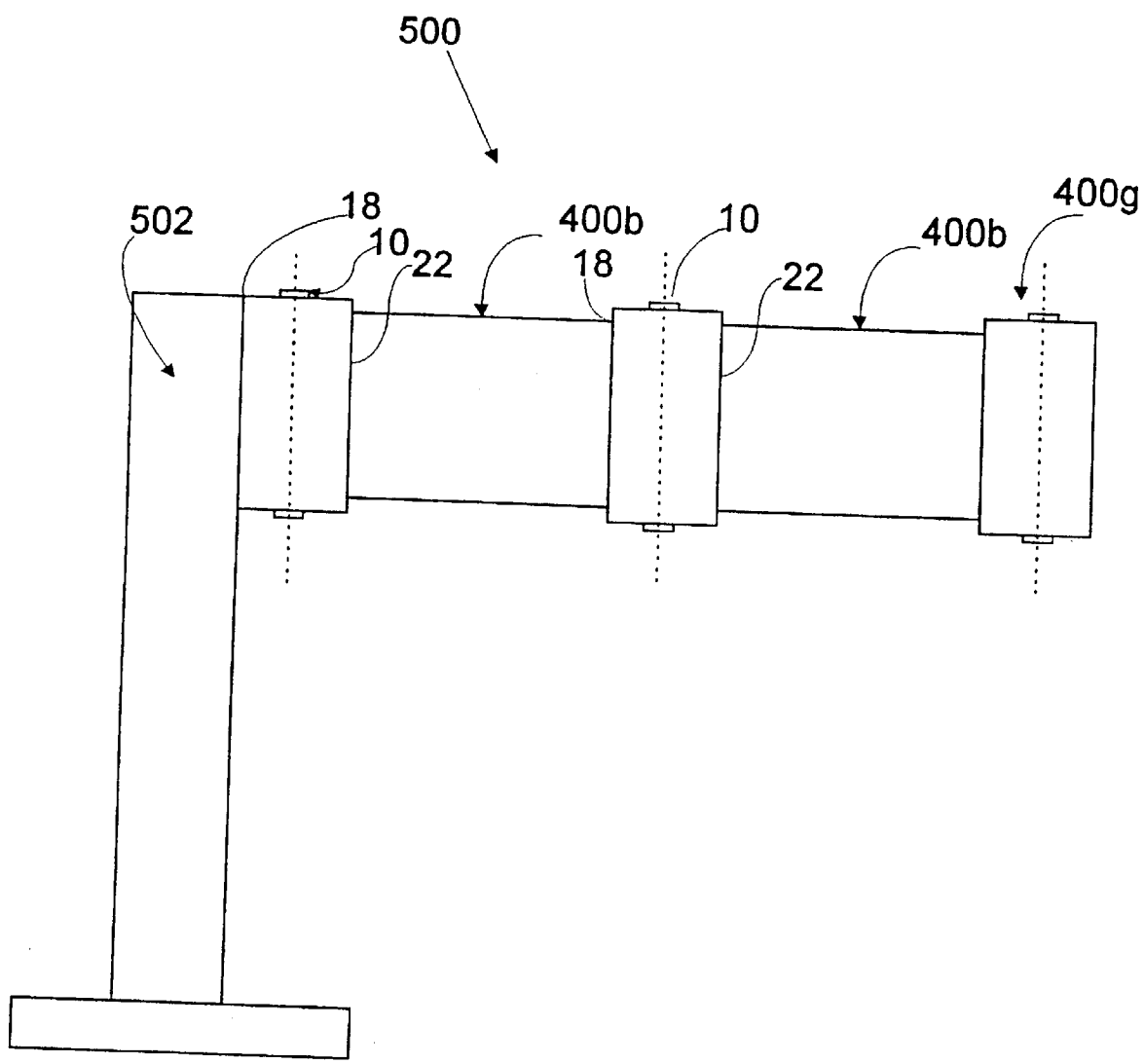
FIG. 9 is a schematic side elevational view of an articulated robot arm comprised of a number of independent modules and adaptors according to the present invention.

For instance, FIG. 9 illustrates a modular robot arm 500 which is mounted to a vertical post 502. The modular robot arm 500 includes a first rotary module 10 mounted to the post 502, a first adaptor 400b mounted proximally to the base plate 22 of the first rotary module 10, a second rotary module 10 mounted distally at an opposed end of the first adaptor 400b, a second adaptor 400b mounted proximally to the base plate 22 of the second rotary module 10, and an adaptor 400g mounted at a distal end of the second adaptor 400b for moving a particular tool (not shown) along a vertical axis. The first and second rotary modules 10 allow for the displacement of the robot arm 500 within a horizontal envelope about the post 502. The control system will automatically detect the number and type of modules and adaptors which are assembled together and will then generate an appropriate algorithm to control the motion of the modular robot arm 500.

Figure 10:
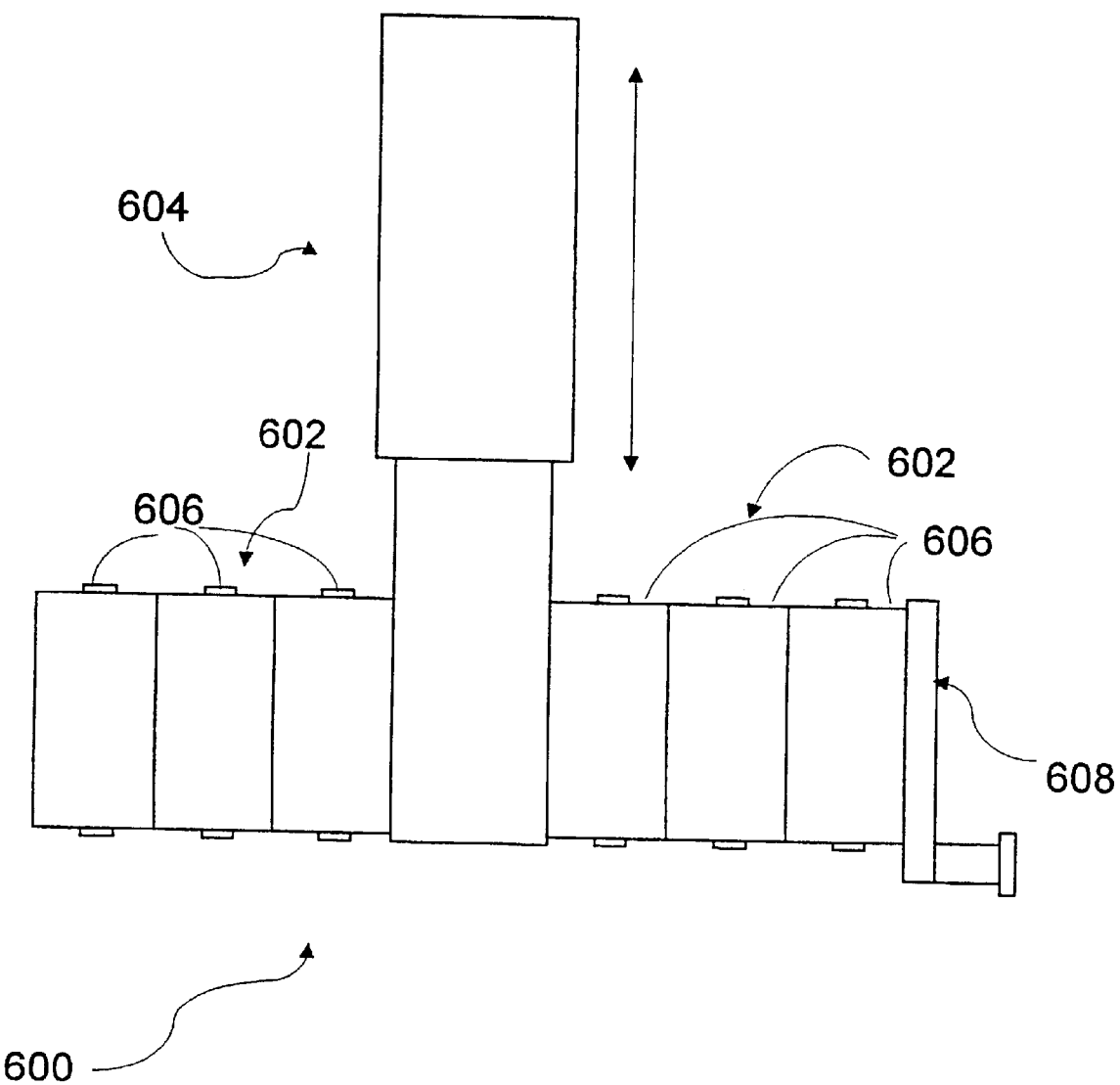
FIG. 10 is a schematic elevational view of a pair of modular robot arms.

FIG. 10 illustrates another robot structure which could be realized with the above described modular construction. More particularly, FIG. 10 shows a robot system 600 comprising a pair of arms 602 attached to a vertically displaceable adaptor 604. Each arm 602 is composed of a series of independent rotary and/or linearly displaceable modules 606. One arm 602 may be provided at a distal end thereof with an adaptor 608 similar to the adaptor 400f described previously.

Figure 11:
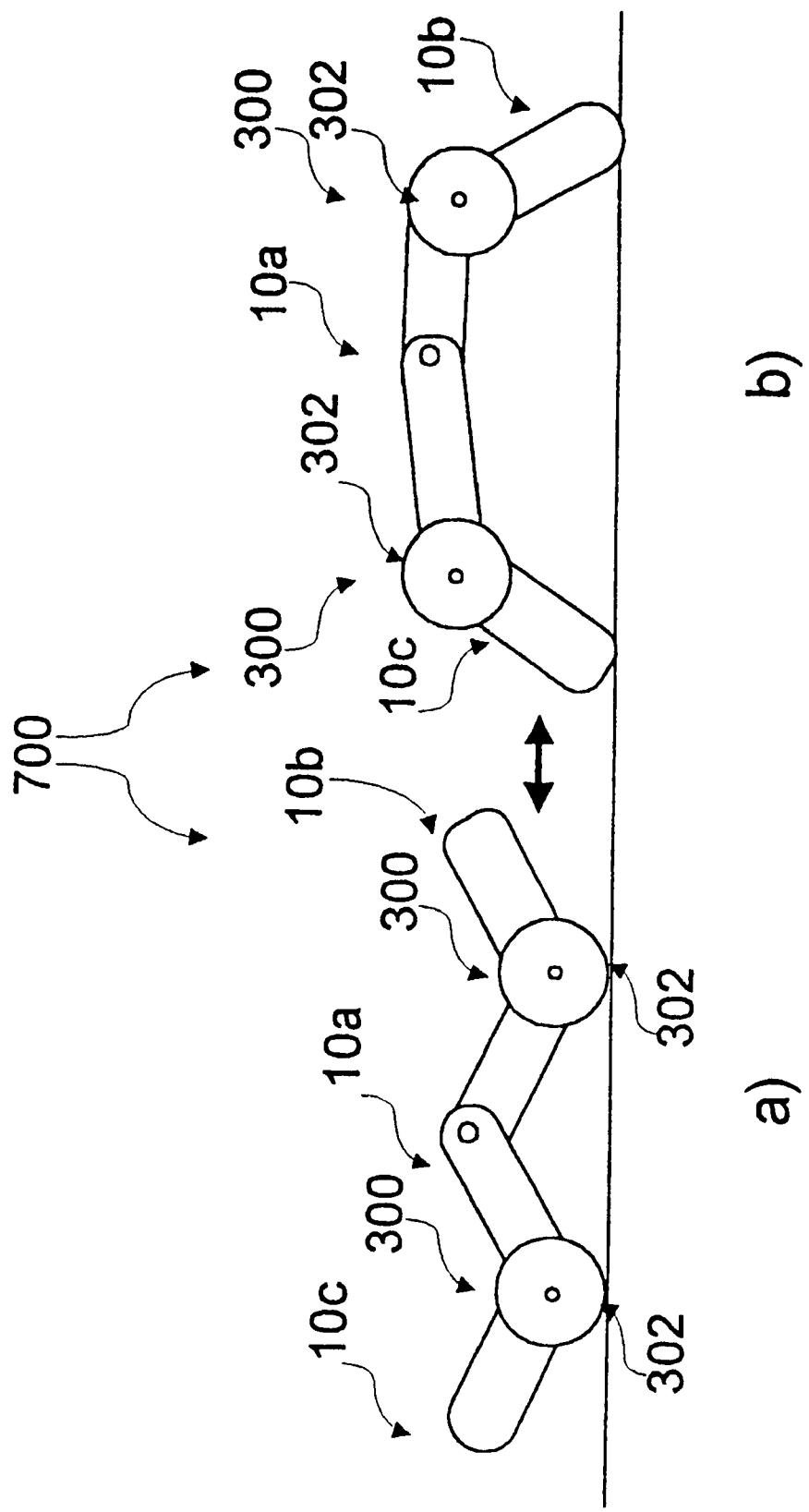
FIGS. 11a and 11b are schematic side elevational views of a transformable modular robot structure shown in different positions.

FIG. 11 shows a modular robot structure 700 composed of two wheeled modules 300 joined by a suitable number of intermediate rotary modules 10a, and of front and rear rotary modules 10b and 10c mounted at opposed ends of the modular robot structure 700. As illustrated in FIG. 11a, the wheels 302 of the supporting runner modules 300 may be used to support and move the robot structure 700 or, alternatively, the front and rear rotary modules 10b and 10c may be used to provide legged locomotion (see FIG. 11b).

What is claimed is:

1. A module for forming a segment of an articulated robot structure, comprising first and second structural members, an axle for pivotally mounting said second structural member to said first structural member, motor means for pivoting said second structural member relative to said first structural member, sensing means for sensing a position of said second structural member, and control means connected to said sensing means for controlling movements of said second structural member, wherein said first and second structural members each includes a base plate and a pair of spaced-apart side plates extending from said base plate, and wherein said base plates of said first and second structural members each includes attachment means for releasably attaching said module to respective adjacent modules, said base plates further including electrical connectors for mating engagement with other electrical connectors of said respective adjacent modules, said electrical connectors being connected to said control means for allowing control commands to be fed through a given number of assembled modules.

2. A module as defined in claim 1, wherein said first and second structural members each has a substantially U-shaped configuration, and wherein said motor means is mounted to said first structural member for applying a torque to said second structural member.

3. A module as defined in claim 2, wherein said side plates of said first and second structural members each include front and rear edges, and wherein said side plates of said first structural member are provided on inner sides thereof with respective shoulder means for providing support surfaces against which said front or rear edge of said side plates of said second structural member may abut when said second structural member is rotated to a limit position thereof.

4. A module as defined in claim 3, wherein said base plate of said second structural member includes opposed lateral portions extending outwardly of said side plates of said second structural member to substantially uniformly abut against said front or rear edge of said side plates of said first structural member when said second structural member is rotated to a limit position thereof.

5. A module as defined in claim 1 wherein said axle extends through said side plates of said first and second structural members, and wherein said axle is idle.

6. A module as defined in claim 1, wherein said motor means are mounted to said base plate of said first structural member between said side plates thereof and wherein said side plates of said second structural member extends inwardly of said side plates of said first structural member.

7. A module as defined in claim 6, wherein said motor means are coupled to a coupling fixedly mounted to an inner surface of one of said side plates of said second structural member, said coupling being centered relative to a rotational axis of said second structural member.

8. A mobile modular robot, comprising:
at least one wheeled module adapted to support and displace said mobile modular robot on a supporting surface, said wheeled module including a pair of spaced-apart connecting plates joined at opposed end portion thereof by a pair of side plates, attachment means for releasably attaching said wheeled module to another module and further including electrical connectors for mating engagement with connectors of another module, said connectors being connected to conductor means for enabling control commands to be fed to and through said wheeled module, wheel means for supporting and moving said wheeled module on a supporting surface, and motor means for driving said wheel means in response to control commands sent to said wheeled module, support modules mounted to respective connecting plates of said wheeled module via said attachment means, said support modules each including at least one rotary module having first and second structural members pivotally attached to one another, second motor means for driving said rotary modules so as to pivot said support modules relative to said wheeled module, and control means for controlling movements of said wheeled module and of said support modules, whereby said mobile modular robot may run on said wheeled module or, alternatively, said support modules may be pivoted be said second motor means such that said support modules support said wheeled module in a raised position over the supporting surface and such that a subsequent actuation of said rotary modules provides legged locomotion.

9. A mobile modular robot as defined in claim 8, wherein said wheel means include a pair of lateral wheels, and wherein said motor means include a motor and transmission assembly for each said lateral wheel.

10. A mobile modular robot as defined in claim 9, wherein each said motor and transmission assembly is mounted internally of said wheeled module.

11. A mobile modular robot as defined in claim 8, wherein sensing means are provided for sensing rotational movements of said wheel means.

12. A flexible robot structure comprising a number of serially-connected rotary modules which each include first and second end portions adapted to mate with end portions of adjacent rotary modules, connecting means for pivotally connecting said first and second end portions together, motor means for driving said rotary modules, and control means for controlling movement of said rotary modules, wherein said rotary modules each includes first and second structural members, each of which includes a base plate and a pair of spaced-apart side plates extending from said base plate, said side plates of said second structural member being pivotally attached to said side plates of said first structural member for pivotal movements about an axis of rotation, said base plate of said first structural member being provided with an inner surface and with opposed front and rear edges, said base plate of said second structural member having an inner surface, and wherein $d_1$ is the distance between said front or rear edges and a reference axis perpendicular to said inner surface of said base plate of said first structural member and intersecting said rotational axis, $d_2$ is the distance between said inner surface of said base plate of said first structural member and said axis of rotation, $d_4$ is the distance between said inner surface of said base plate of said second structural member and said axis of rotation, $d_3$ is the distance between said axis of rotation of a first module and said inner surface of said base plate of said first structural member of an adjacent module mounted to said base plate of said second structural member of said first module, $\epsilon$ is the distance between said inner surface of said base plate of said second structural member of said first module and said inner surface of said first structural member of said adjacent module, and wherein $d_1=d_2=d_3$ and $d_4=d_3-\epsilon$.

13. A flexible robot structure as defined in claim 12, wherein said first and second structural members each has a substantially U-shaped configuration, and wherein said flexible robot structure is provided with opposed first and second end modules, said first and second end portions respectively of said first and second end modules being interconnectable, whereby said motor means may be operated to connect said first and second end modules together thereby forming a loop configuration.

14. An articulated structure comprising at least two serially connected modules which each comprise first and second structural members pivotally mounted to one another, and motor means for imparting a rotational movement to said second structural member relative to said first structural member, said first structural member of each module defining abutment means against which said first structural member of an adjacent module may be supported when said second structural member connecting said first structural members of two adjacent modules is rotated to a limit position thereof, wherein said first and second structural members of each module each includes a base plate and a pair of spaced-apart side plates extending from said base plate, said side plates of said second structural member being pivotally attached to said side plates of said first structural member, and wherein attachment means are provided for mounting said base plate of said second structural member of a first module to said base plate of said first structural member of a second module.

15. An articulated structure as defined in claim 14, wherein said base plate of said first structural member has a top surface and front and rear surfaces, said front or rear surface of said base plate of said first structural member of said second module being adapted to uniformly abut against said top surface of said base plate of said first structural member of said first module when said second structural member of said first module is rotated to a limit position thereof.

16. A module for forming a segment of an articulated structure, comprising first and second structural members pivotally mounted together, motor means for imparting a rotational movement to said second structural member relative to said first structural member, said first and second structural members having cooperating abutment means for providing substantially uniform support to said second structural member when rotated to a limit position thereof, wherein said first and second structural members each include a base plate and a pair of spaced-apart side plates extending from said base plate, said side plates of said second structural member being pivotally attached to said side plates of said first structural member.

17. A module as defined in claim 16, wherein said side plates of said second structural member comprise front and rear edges, and wherein said abutment means include a pair of shoulders projecting from said side plates of said first structural member to provide abutment surfaces against which said front or rear edge of said second structural member may abut when said second structural member is rotated to a limit position thereof.

18. A module as defined in claim 17, wherein said side plates of said second structural member include generally bevelled ends adjacent a rotational axis of said second structural member so as to provide clearance for enabling rotational movements of said second structural member relative to said first structural member.

19. A module as defined in claim 16, wherein said side plates of said second structural member are accommodated between said side plates of said first structural member, and wherein said base plate of said second structural member includes lateral portions extending outwardly of said side plates of said second structural member for substantially uniformly abutting against front or read edges of said side plates of said first structural member when said second structural member is rotated to a limit position thereof.

20. A module as defined in claim 16, in combination with a second module serially connected to said module, wherein said first structural member of each module defines second abutment means against which said first structural member of an adjacent module may be supported when said second structural member connecting said first structural members of two adjacent modules is rotated to a limit position thereof.

21. An extendable and contractible module for forming a segment of an articulated robot structure, comprising first and second structural members linearly moveable with respect to each other, at least one of said structural members being adapted to be physically and electrically coupled to another module, and motor means for imparting relative linear motion to said first and second structural members, wherein said first and second structural members each includes a base plate and a pair of spaced-apart side plates extending from said base plate and defining therewith a substantially U-shaped configuration, said side plates of said first structural member each defining a guide slot, said side plates of said second structural member being each provided with an outwardly protruding pin means constrained to move along a respective guide slot.

22. An articulated structure comprising at least first and second serially-connected modules, each including first and second structural members pivotally mounted together, said first and second structural members of each of said modules having cooperating abutment means for providing substantially uniform support to said second structural member when rotated to a limit position thereof, and motor means for imparting a rotational movement to said second structural member relative to said first structural member, wherein said first structural member of each module defines second abutment means against which said first structural member of an adjacent module may be supported when said second structural member connecting said first structural members of two adjacent modules is rotated to a limit position thereof.

23. An articulated structure as defined in claim 22, wherein said first and second structural members each includes a base plate and a pair of spaced-apart side plates extending from said base plate and defining therewith a substantially U-shaped configuration, said side plates of said second structural member being pivotally attached to said side plates of said first structural member.

24. An articulated structure as defined in claim 23, wherein said side plates of said second structural member comprise front and rear edges, and wherein said abutment means include a pair of shoulders projecting from said side plates of said first structural member to provide abutment surfaces against which said front or rear edge of said second structural member may abut when said second structural member is rotated to a limit position thereof.

25. An articulated structure as defined in claim 23, wherein said side plates of said second structural member are accommodated between said side plates of said first structural member, and wherein said base plate of said second structural member includes lateral portions extending outwardly of said side plates of said second structural member for substantially uniformly abutting against front or read edges of said side plates of said first structural member when said second structural member is rotated to a limit position thereof.

* * * * *